Patented Aug. 13, 1929.

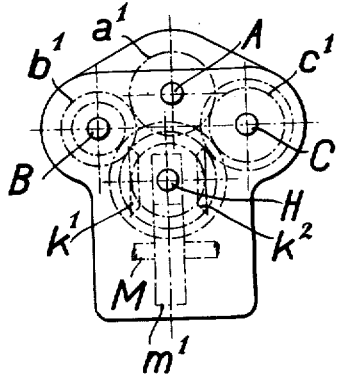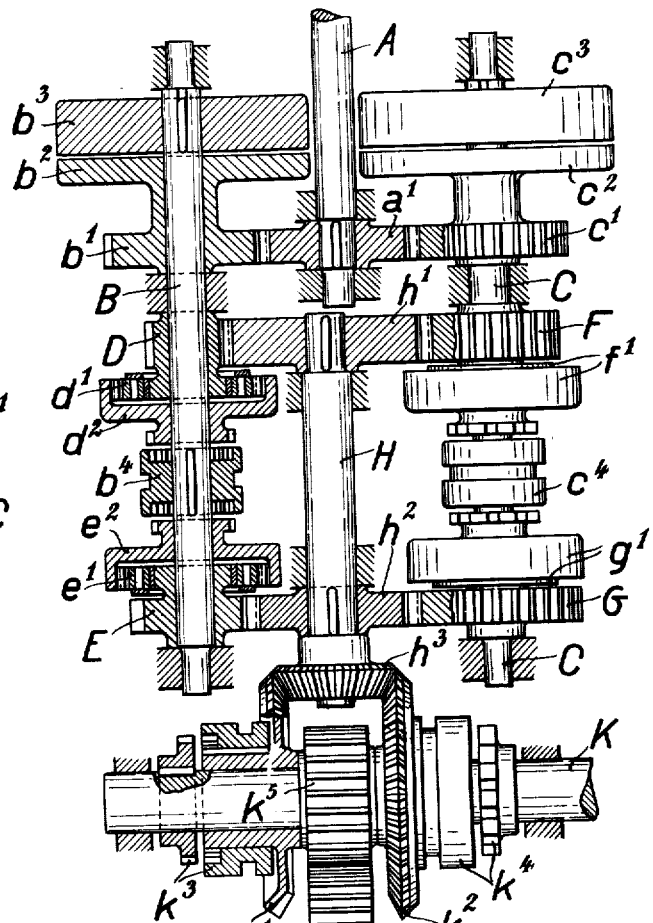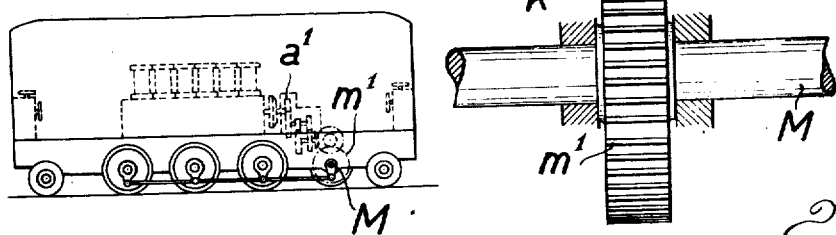

1,724,202

UNITED STATES PATENT OFFICE.

WERNER JACOBS, OF ESSEN, GERMANY, ASSIGNOR TO FRIED. KRUPP AKTIENGESELL-SCHAFT, OF ESSEN-ON-THE-RUHR, GERMANY.

VARIABLE-SPEED GEAR.

Application filed September 30, 1927, Serial No. 223,231, and in Germany June 22, 1927.

This invention relates to variable speed gears comprising two alternative gear-wheel trains of different ratios of transmission which permit a passage from one speed step to another without the power transmission being interrupted. In known gears of this kind there is arranged for each gear-wheel train a particular slip clutch adapted to be operated at will for connecting the driving and driven members through the gear-wheel train appertaining thereto. The object of the present invention is to so improve the variable speed gears referred to that the driving and driven members may be connected alternatively through one gear-wheel train or the other by means of a single slip clutch common to them whereby a more simple and cheap construction is produced.

In order that my invention may be more easily understood, a preferred embodiment of the same adapted to Diesel locomotives is illustrated in the drawing which accompanies and forms part of this specification, and in which:

Fig. 1 is an end view of the variable speed gear enclosed in a casing,

Fig. 2 is a top view of the gear in enlarged scale, and

Fig. 3 is a lateral view of a Diesel locomotive equipped with the variable speed gear according to my invention.

Referring now to these figures, A denotes the engine shaft or a shaft coupled therewith, having fast on it a spur wheel $a^1$ which is permanently in mesh with two spur wheels $b^1$ and $c^1$ loosely mounted on intermediate shafts B and C, respectively. Each of the spur wheels $b^1$ and $c^1$ is rigidly connected to one half $b^2$ and $c^2$, respectively, of a slip clutch. These clutches are designed so that they can be operated during running and may be constructed as electromagnetic friction clutches. Their other halves $b^3$ and $c^3$ are fast on the intermediate shafts B and C, respectively. Shaft B has loosely mounted on it two spur wheels D and E rigidly connected to one half $d^1$ and $e^1$, respectively, of a coupling, which is adapted to automatically throw itself into gear. These couplings may be constructed like the free wheel hubs of bicycles, as clamping clutches, or in a similar manner. The other halves, $d^2$ and $e^2$, of these couplings are likewise loosely mounted on shaft B and may be coupled therewith selectively by means of a toothed or clamping coupling $b^4$.

In the same manner there are loosely mounted on shaft C two spur wheels F and G which can be coupled thereto through the intermediary of a toothed or claw coupling $c^4$ and free wheel couplings $f^1$ and $g^1$. The spur wheels D and F are permanently in mesh with a spur wheel $h^1$ fast on a shaft H; the spur wheels E and G are in mesh with another spur wheel $h^2$ fast on shaft H. On one of its free ends shaft H carries a bevel wheel $h^3$ which is in mesh with two bevel wheels $k^1$ and $k^2$ loosely mounted on a shaft K. By means of couplings $k^3$ and $k^4$ the bevel wheels $k^1$ and $k^2$ can be coupled selectively with shaft K. A spur wheel $k^5$ is rigidly mounted on shaft K between the bevel wheels $k^1$ and $k^2$ and actuates a loose shaft M or the like through the intermediary of a spur wheel $m^1$.

The whole gearing is so arranged that the gear ratio of the pairs of spur wheels D $h^1$, F $h^1$, E $h^2$ and G $h^2$ increases in this consecutive order.

After starting the motor, first the coupling member $b^4$ is brought into engagement with the coupling half $d^2$, whereby the free wheel coupling $d^2$ $d^1$ is enabled to act and to couple the wheel D with shaft B. Coupling $d^2$, $d^1$ is so arranged, that the drive is from shaft B to shaft H and that the drive cannot go from shaft H to shaft B. Then the slip clutch $b^2$, $b^3$ is thrown in. Wheel D then transmits its rotation through wheel $h^1$, shaft H, and bevel wheel $h^3$ to the bevel wheels $k^1$ and $k^2$, one of which drives the loose shaft M through the intermediary of gearing $k^5$, $m^1$ in forward or backward direction, according to whether the coupling $k^3$ or $k^4$ has been thrown in.

When a passage is to be made to the next speed, first the coupling member $c^4$ and then the slip clutch $c^2$ $c^3$ are thrown into operation, so that the spur wheels F and $c^1$ can be coupled with shaft C upon free wheel coupling $f^1$ coming into operation. The transmission of power by shaft B is at first maintained during the throwing-in of clutch $c^2$ $c^3$, until shaft C rotates with the same angular speed as wheel F. As soon as the angular speed of shaft C exceeds that of wheel F, the coupling $f^1$ acts. The gearing F $h^1$ then imparts to shaft H a greater angular speed than the gearing D $h^1$. This causes the wheel D to run in advance of shaft B, so that the coupling $d^1$ $d^2$ is automatically disengaged, and the power of the engine is transmitted only by gearing F $h^1$. The clutch $b^3$ $b^2$ is then disengaged. During the passage from one speed step to the next higher one, no interruption of the power transmission thus takes place, as the lower transmission gear, e. g. D $h^1$, is disengaged only after the higher gear, e. g. F $h^1$, has already begun transmitting the power.

When, inversely, a passage is to be executed from a higher speed step, e. g. F $h^1$, to a lower one, e. g. D $h^1$, the clutch $b^3$ $b^2$ is first thrown in with the coupling member $b^4$ still in mesh with the coupling half $d^2$. The spur wheel D rotating, according to the foregoing, with a greater angular speed than shaft B does not cause the coupling $d^2$ $d^1$ at first to act. Then the clutch $c^3$ $c^2$ is disengaged. This causes the rate of revolution of the engine to immediately increase and, consequently, the angular speed of shaft B increases too, so that the coupling $d^1$ $d^2$ is thrown in and the power transmission now takes place through the gearing D $h^1$.

Of course, the gearing may further be so arranged, that simultaneously with the disengagement of the clutch $c^3$ $c^2$ the rate of revolution of the engine is increased by increasing the fuel supply or the like. Any interruption of the power transmission thus does not take place even upon returning from a higher speed step to a lower one.

It needs no explanation in detail, in what manner a passage from the speed step F $h^1$ to the next higher step E $h^2$, and from the latter to the speed step G $h^2$, and inversely, is to be executed.

The arrangement may further be so chosen, that the couplings $d^1$ $d^2$ and $e^1$ $e^2$, mounted on the intermediate shaft, e. g. B, are replaced by one single clutch shiftably splined on said shaft and adapted to selectively engage one of the spur wheels mounted on the latter, e. g. wheel D or E.

What I claim and desire to secure by Letters Patent, is:—

1. A variable speed gearing comprising driving and driven members, two alternative gear-wheel trains of different ratios of transmission interposed between said driving and driven members, a free wheel coupling for said gear-wheel trains, a slip clutch common to said gear-wheel trains, a coupling adapted to be operated at will for alternatively connecting said driving and driven members through one or the other of said gear-wheel trains and said common slip clutch, and means for operatively connecting said driving and driven members independently of said slip clutch.

2. A variable speed gearing comprising driving and driven members, two alternative gear-wheel trains of different ratios of transmission interposed between said driving and driven members, a free wheel coupling for said gear-wheel trains, a slip clutch common to said gear-wheel trains, a coupling adapted to be operated at will for alternatively connecting said driving and driven members through one or the other of said gear-wheel trains and said common slip clutch, a second slip clutch adapted to be operated at will and a third gear-wheel train corresponding to an intermediate third ratio of transmission and provided with a free wheel coupling, said second slip clutch and said third gear-wheel train being arranged in series and allowing said driving and driven member to be connected independently of said first-named slip clutch.

3. In a variable speed gear as claimed in claim 8 a fourth gear-wheel train corresponding to a fourth ratio of transmission and a coupling adapted to be operated at will for connecting said driving and driven members through said fourth gear-wheel train and the second slip clutch.

The foregoing specification signed at Cologne, Germany, this 6th day of September, 1927.

WERNER JACOBS.

CERTIFICATE OF CORRECTION.

Patent No. 1,724,202.  Granted August 13, 1929, to

WERNER JACOBS.

It is hereby certified that error appears in the printed specification of the above numbered patent requiring correction as follows: Page 2, line 86, claim 3, for "claim 8" read "claim 2"; and that the said Letters Patent should be read with this correction therein that the same may conform to the record of the case in the Patent Office.

Signed and sealed this 10th day of September, A. D. 1929.

(Seal)

M. J. Moore,
Acting Commissioner of Patents.

F $h^1$ then imparts to shaft H a greater angular speed than the gearing D $h^1$. This causes the wheel D to run in advance of shaft B, so that the coupling $d^1$ $d^2$ is automatically disengaged, and the power of the engine is transmitted only by gearing F $h^1$. The clutch $b^3$ $b^2$ is then disengaged. During the passage from one speed step to the next higher one, no interruption of the power transmission thus takes place, as the lower transmission gear, e. g. D $h^1$, is disengaged only after the higher gear, e. g. F $h^1$, has already begun transmitting the power.

When, inversely, a passage is to be executed from a higher speed step, e. g. F $h^1$, to a lower one, e. g. D $h^1$, the clutch $b^3$ $b^2$ is first thrown in with the coupling member $b^4$ still in mesh with the coupling half $d^2$. The spur wheel D rotating, according to the foregoing, with a greater angular speed than shaft B does not cause the coupling $d^2$ $d^1$ at first to act. Then the clutch $c^3$ $c^2$ is disengaged. This causes the rate of revolution of the engine to immediately increase and, consequently, the angular speed of shaft B increases too, so that the coupling $d^1$ $d^2$ is thrown in and the power transmission now takes place through the gearing D $h^1$.

Of course, the gearing may further be so arranged, that simultaneously with the disengagement of the clutch $c^3$ $c^2$ the rate of revolution of the engine is increased by increasing the fuel supply or the like. Any interruption of the power transmission thus does not take place even upon returning from a higher speed step to a lower one.

It needs no explanation in detail, in what manner a passage from the speed step F $h^1$ to the next higher step E $h^2$, and from the latter to the speed step G $h^2$, and inversely, is to be executed.

The arrangement may further be so chosen, that the couplings $d^1$ $d^2$ and $e^1$ $e^2$, mounted on the intermediate shaft, e. g. B, are replaced by one single clutch shiftably splined on said shaft and adapted to selectively engage one of the spur wheels mounted on the latter, e. g. wheel D or E.

What I claim and desire to secure by Letters Patent, is:—

1. A variable speed gearing comprising driving and driven members, two alternative gear-wheel trains of different ratios of transmission interposed between said driving and driven members, a free wheel coupling for said gear-wheel trains, a slip clutch common to said gear-wheel trains, a coupling adapted to be operated at will for alternatively connecting said driving and driven members through one or the other of said gear-wheel trains and said common slip clutch, and means for operatively connecting said driving and driven members independently of said slip clutch.

2. A variable speed gearing comprising driving and driven members, two alternative gear-wheel trains of different ratios of transmission interposed between said driving and driven members, a free wheel coupling for said gear-wheel trains, a slip clutch common to said gear-wheel trains, a coupling adapted to be operated at will for alternatively connecting said driving and driven members through one or the other of said gear-wheel trains and said common slip clutch, a second slip clutch adapted to be operated at will and a third gear-wheel train corresponding to an intermediate third ratio of transmission and provided with a free wheel coupling, said second slip clutch and said third gear-wheel train being arranged in series and allowing said driving and driven member to be connected independently of said first-named slip clutch.

3. In a variable speed gear as claimed in claim 8 a fourth gear-wheel train corresponding to a fourth ratio of transmission and a coupling adapted to be operated at will for connecting said driving and driven members through said fourth gear-wheel train and the second slip clutch.

The foregoing specification signed at Cologne, Germany, this 6th day of September, 1927.

WERNER JACOBS.

CERTIFICATE OF CORRECTION.

Patent No. 1,724,202.  Granted August 13, 1929, to

WERNER JACOBS.

It is hereby certified that error appears in the printed specification of the above numbered patent requiring correction as follows: Page 2, line 86, claim 3, for "claim 8" read "claim 2"; and that the said Letters Patent should be read with this correction therein that the same may conform to the record of the case in the Patent Office.

Signed and sealed this 10th day of September, A. D. 1929.

(Seal)

M. J. Moore,
Acting Commissioner of Patents.